(12) United States Patent
Broussard et al.

(10) Patent No.: US 12,554,664 B1
(45) Date of Patent: Feb. 17, 2026

(54) SYSTEMS AND METHODS RELATING TO A MULTI-LEVEL TRAFFIC DISTRIBUTION SCHEME

(71) Applicant: Advanced Micro Devices, Inc., Santa Clara, CA (US)

(72) Inventors: Bryan P. Broussard, Austin, TX (US); Eric Christopher Morton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 109 days.

(21) Appl. No.: 18/193,068

(22) Filed: Mar. 30, 2023

(51) Int. Cl.
*G06F 13/38* (2006.01)

(52) U.S. Cl.
CPC ................. *G06F 13/385* (2013.01)

(58) Field of Classification Search
CPC .................................................. G06F 13/385
See application file for complete search history.

(56) References Cited

U.S. PATENT DOCUMENTS

| | | | | |
|---|---|---|---|---|
| 6,141,044 | A * | 10/2000 | Anderson | H04N 1/212 386/E5.072 |
| 7,177,295 | B1 * | 2/2007 | Sholander | H04W 40/26 370/338 |
| 2005/0251342 | A1 * | 11/2005 | Market | G01V 1/48 702/6 |
| 2007/0171833 | A1 * | 7/2007 | Singh | H04L 45/00 370/389 |
| 2011/0252168 | A1 * | 10/2011 | Saripalli | G06F 13/4286 711/E12.079 |
| 2015/0269104 | A1 * | 9/2015 | Blankenship | G06F 13/1668 710/316 |
| 2016/0012010 | A1 * | 1/2016 | Ganapathy | G06F 9/4411 712/35 |
| 2017/0010628 | A1 * | 1/2017 | Byers | G06F 12/00 |
| 2017/0235695 | A1 * | 8/2017 | Blankenship | G06F 13/4022 710/313 |
| 2018/0189081 | A1 * | 7/2018 | Upasani | G06F 9/4401 |
| 2019/0042437 | A1 * | 2/2019 | Guim Bernat | G06F 11/3034 |
| 2019/0042508 | A1 * | 2/2019 | Raghav | G06F 13/4282 |
| 2019/0332551 | A1 * | 10/2019 | Siegel | G06F 3/061 |
| 2023/0195662 | A1 * | 6/2023 | Kalyanasundharam | G06F 3/061 |
| 2025/0106248 | A1 * | 3/2025 | Sarakas | H04L 63/1483 |

\* cited by examiner

*Primary Examiner* — Henry Tsai
*Assistant Examiner* — Aurangzeb Hassan
(74) *Attorney, Agent, or Firm* — Greenberg Traurig, LLP (57) ABSTRACT

The disclosed method relating to a multi-level traffic distribution scheme can include sending a message specifying an identifier for a first coherent socket extension link as a destination and routing the message to a second and distinct coherent socket extension link. The identifier for the first coherent socket extension link can include an alias for the second and distinct coherent socket extension link. Various other methods and systems are also disclosed.

20 Claims, 6 Drawing Sheets

| Link Partitioning With 3-link (Physical Links 0, 1, 2) After Change |||
|---|---|---|
| CCM0 Link Configuration:<br>  Link Usage Based on Destination Address Mod 4:<br>    Value 0: Logical CAKE0, Physical CAKE0<br>    Value 1: Logical CAKE1, Physical CAKE1<br>    Value 2: Logical CAKE2, Physical CAKE2<br>    Value 3: Logical CAKE3, Physical CAKE0<br>CCM1 Link Configuration:<br>  Link Usage Based on Destination Address Mod 4:<br>    Value 0: Logical CAKE1, Physical CAKE1<br>    Value 1: Logical CAKE3, Physical CAKE0<br>    Value 2: Logical CAKE4, Physical CAKE1<br>    Value 3: Logical CAKE5, Physical CAKE2<br>CCM2 Link Configuration:<br>  Link Usage Based on Destination Address Mod 4:<br>    Value 0: Logical CAKE0, Physical CAKE0<br>    Value 1: Logical CAKE2, Physical CAKE2<br>    Value 2: Logical CAKE4, Physical CAKE1<br>    Value 3: Logical CAKE5, Physical CAKE2<br>CCM3 Link Configuration:<br>  Link Usage Based on Destination Address Mod 4:<br>    Value 0: Logical CAKE0, Physical CAKE0<br>    Value 1: Logical CAKE1, Physical CAKE1<br>    Value 2: Logical CAKE2, Physical CAKE2<br>    Value 3: Logical CAKE3, Physical CAKE0<br>CCM4 Link Configuration:<br>  Link Usage Based on Destination Address Mod 4:<br>    Value 0: Logical CAKE1, Physical CAKE1<br>    Value 1: Logical CAKE3, Physical CAKE0<br>    Value 2: Logical CAKE4, Physical CAKE1<br>    Value 3: Logical CAKE5, Physical CAKE2<br>CCM5 Link Configuration:<br>  Link Usage Based on Destination Address Mod 4:<br>    Value 0: Logical CAKE0, Physical CAKE0<br>    Value 1: Logical CAKE2, Physical CAKE2<br>    Value 2: Logical CAKE4, Physical CAKE1<br>    Value 3: Logical CAKE5, Physical CAKE2<br>CCM6 Link Configuration:<br>  Link Usage Based on Destination Address Mod 4:<br>    Value 0: Logical CAKE1, Physical CAKE1<br>    Value 1: Logical CAKE3, Physical CAKE0<br>    Value 2: Logical CAKE4, Physical CAKE1<br>    Value 3: Logical CAKE5, Physical CAKE2<br>CCM7 Link Configuration:<br>  Link Usage Based on Destination Address Mod 4:<br>    Value 0: Logical CAKE0, Physical CAKE0<br>    Value 1: Logical CAKE2, Physical CAKE2<br>    Value 2: Logical CAKE4, Physical CAKE1<br>    Value 3: Logical CAKE5, Physical CAKE2 | CS_DDR0 Link Configuration:<br>  Uses Logical CAKE0, Physical CAKE0<br><br>CS_DDR1 Link Configuration:<br>  Uses Logical CAKE0, Physical CAKE0<br><br>CS_DDR2 Link Configuration:<br>  Uses Logical CAKE0, Physical CAKE0<br><br>CS_DDR3 Link Configuration:<br>  Uses Logical CAKE0, Physical CAKE0<br><br>CS_DDR4 Link Configuration:<br>  Uses Logical CAKE1, Physical CAKE1<br><br>CS_DDR5 Link Configuration:<br>  Uses Logical CAKE1, Physical CAKE1<br><br>CS_DDR6 Link Configuration:<br>  Uses Logical CAKE1, Physical CAKE1<br><br>CS_DDR7 Link Configuration:<br>  Uses Logical CAKE1, Physical CAKE1<br><br>CS_DDR8 Link Configuration:<br>  Uses Logical CAKE2, Physical CAKE2<br><br>CS_DDR9 Link Configuration:<br>  Uses Logical CAKE2, Physical CAKE2<br><br>CS_DDR10 Link Configuration:<br>  Uses Logical CAKE2, Physical CAKE2<br><br>CS_DDR11 Link Configuration:<br>  Uses Logical CAKE2, Physical CAKE2 ||

*FIG. 6*

SYSTEMS AND METHODS RELATING TO A MULTI-LEVEL TRAFFIC DISTRIBUTION SCHEME

BACKGROUND

Different subcomponents within a semiconductor computing device can communicate with each other to perform computing functionality. Nevertheless, in some scenarios, a number of receiving subcomponents might not evenly divide into a number of inputs or sending subcomponents, or vice versa, which can create an inefficiency or imbalance that effectively overloads one or more of the receiving subcomponents, as discussed further below.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 6 is a table of simulated output illustrating the aliasing of coherent socket extension links.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

Figure 1:
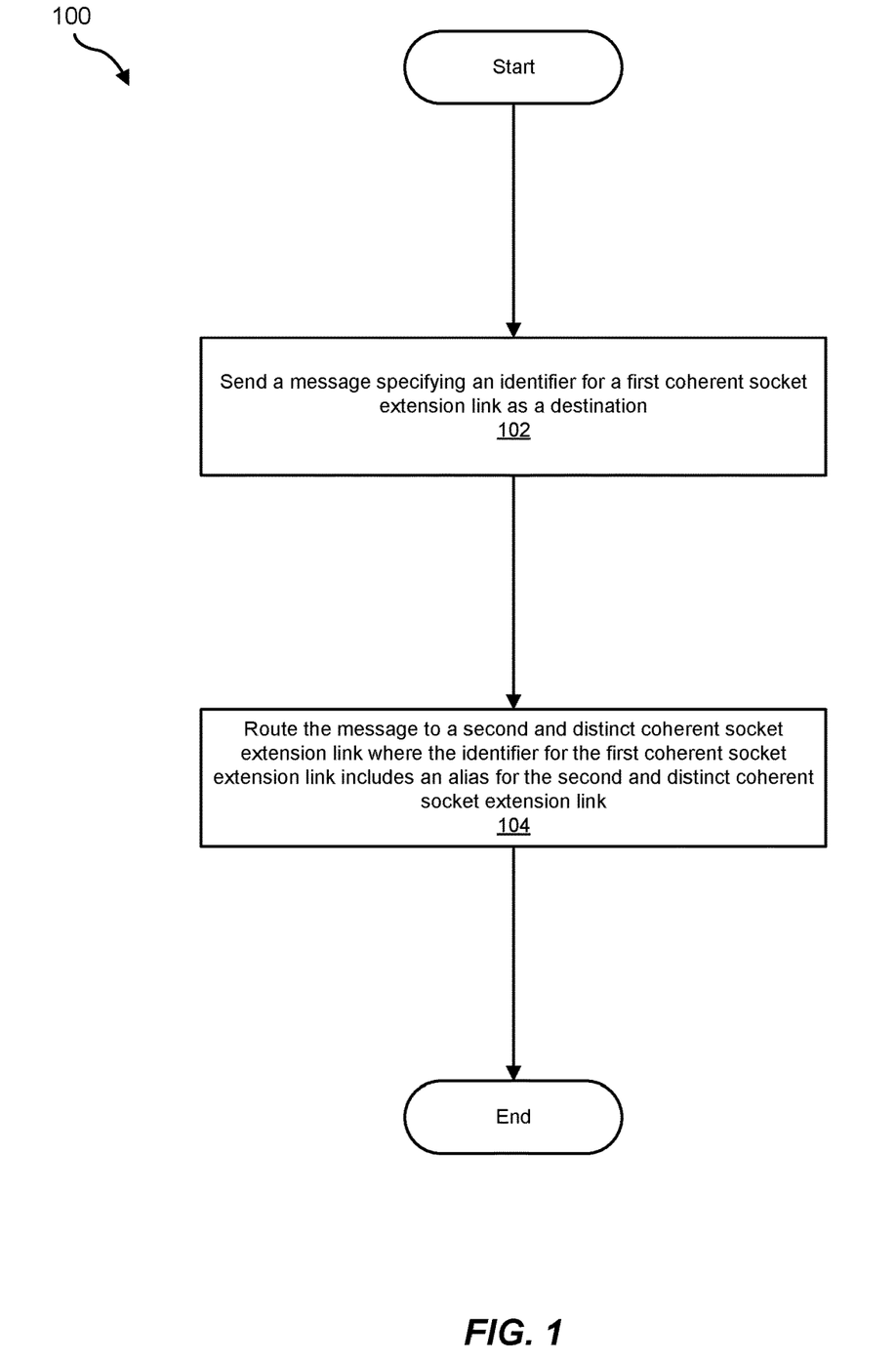
FIG. 1 is a flow diagram for an example method relating to a multi-level traffic distribution scheme.
Figure 2:
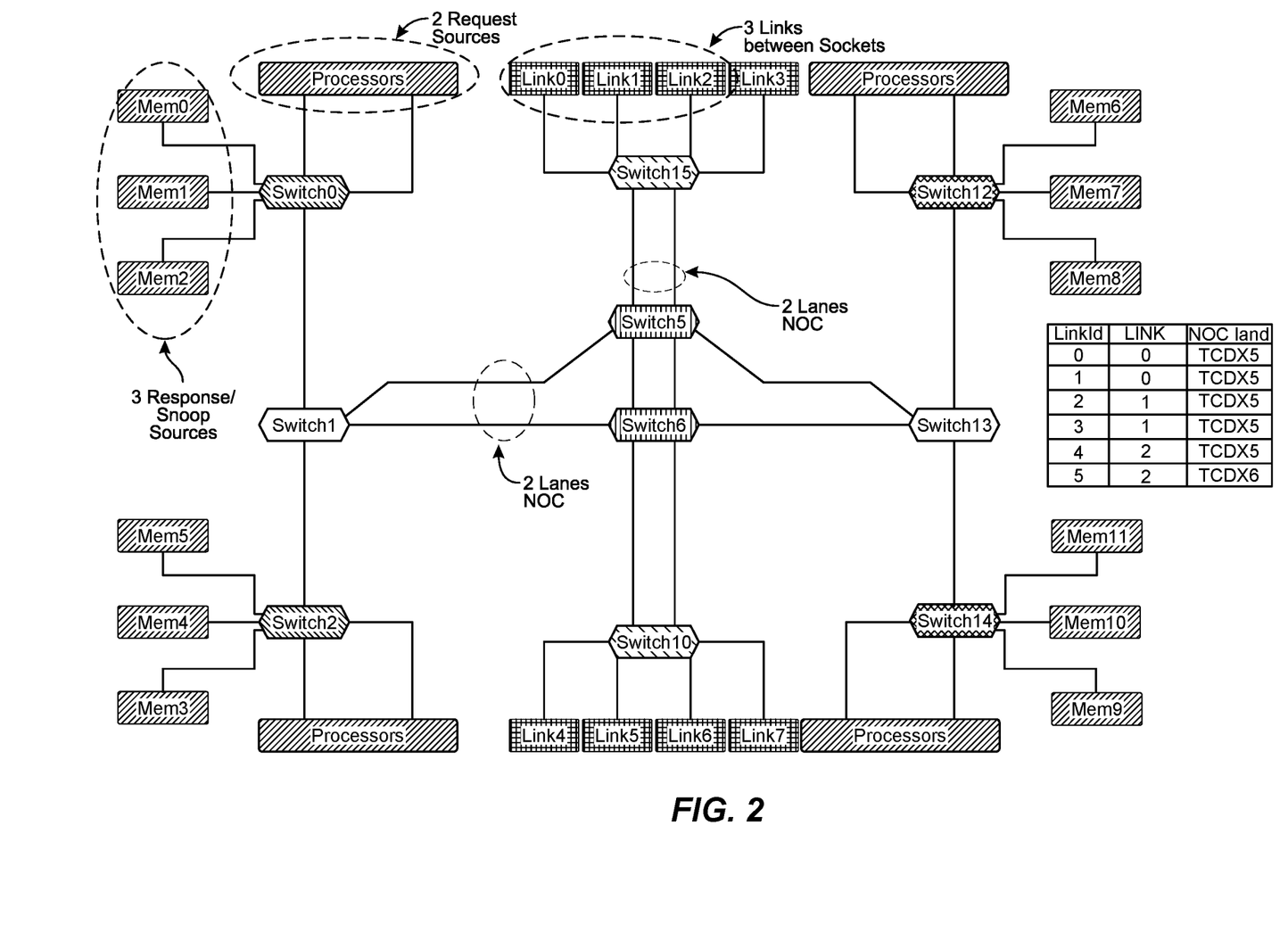
FIG. 2 is a block diagram of an example fabric within an input/output die.

The present disclosure is generally directed to systems and methods relating to a multi-level traffic distribution scheme. Within a semiconductor computing device, such as an input/output die, different subcomponents can seek to communicate with each other as part of computing processing. By way of example, FIG. 1 illustrates an example method that can be performed within the context of an example fabric shown in FIG. 2, as discussed further below. FIG. 2 shows an example fabric within such an input/output die, in which case different sending subcomponents such as processors can seek to communicate with other receiving subcomponents, such as memories or coherent stations (e.g., "Mem0" and "Mem1"), or vice versa.

For example, all of the fabric shown in FIG. 2 can correspond to a single microprocessor socket of a semiconductor computing device, and the sending subcomponents can seek to communicate with receiving subcomponents on a second and distinct socket. The fabric of FIG. 2 can include eight separate coherent socket extension links, which can be referred to by the shorthand "links" (e.g., "Link1" and "Link2", etc.), for this inter-socket communication, and yet only three of these links might have been enabled in some configurations (i.e., Link0-Link2). On the other hand, receiving subcomponents such as Mem0-Mem2 in FIG. 2 might have only two intra-fabric communication channels or lanes (i.e., one lane from Switch1 to Switch5 and another lane from Switch1 to Switch6) over which to send messages directed to one or more of the enabled links. Because the number of intra-fabric communication channels and the number of coherent socket extension links do not evenly divide into each other, one or more of these subcomponents can become overloaded and create an imbalance that degrades overall computing speed and performance. To address these performance inefficiencies, this application discloses a method for aliasing one or more of the coherent socket extension links such that an effective total number of coherent socket extension links is increased or doubled, after which point the number of intra-fabric communication channels (i.e., two) becomes divisible into the effective total number of coherent socket extension links (i.e., six) and the performance inefficiency can be eliminated, as discussed in more detail below.

In some examples, a corresponding method can include sending a message specifying an identifier for a first coherent socket extension link as a destination and routing the message to a second and distinct coherent socket extension link. In such examples, the identifier for the first coherent socket extension link includes an alias for the second and distinct coherent socket extension link.

In some examples, the message is sent by a core to a coherent station.

In some examples, the message includes a multicast probe.

In some examples, a routing table within a switch records that the identifier for the first coherent socket extension link includes the alias for the second and distinct coherent socket extension link.

In further examples, the routing table creates aliases for coherent socket extension links such that a total number of coherent socket extension links is increased to a number that is evenly divisible by a number of inputs or the number of inputs is evenly divisible by the total number of coherent socket extension links.

In some examples, the inputs include coherent stations or intra-fabric communication channels.

In some examples, the routing table doubles a number of coherent socket extension links such that a total number of coherent socket extension links forms a power of two.

In some examples, each coherent socket extension link includes a link for communications between two sockets on a semiconductor computer device or communications between one socket on the semiconductor computer device and a peripheral device.

In some examples, the method is performed on a semiconductor computing device with two sockets.

In some examples, the method is performed by a scalable fabric within an input/output die.

A corresponding semiconductor device can include a sender that sends a message specifying an identifier for a first coherent socket extension link as a destination and a routing table that routes the message to a second and distinct coherent socket extension link. In these examples, the identifier for the first coherent socket extension link includes an alias for the second and distinct coherent socket extension link.

Another corresponding method can include embedding, within a semiconductor device, a sender that sends a message specifying an identifier for a first coherent socket extension link as a destination, and the method can further include embedding, within the semiconductor device, a routing table that routes the message to a second and distinct coherent socket extension link. In such examples, the identifier for the first coherent socket extension link includes an alias for the second and distinct coherent socket extension link.

FIG. 1 is a flow diagram of an example computer-implemented method 100 relating to a multi-level traffic distribution scheme. The steps shown in FIG. 1 can be performed by any suitable computing or semiconductor device, including the fabric of FIG. 2, for example. In one example, each of the steps shown in FIG. 1 can represent an algorithm whose structure includes and/or is represented by multiple sub-steps, examples of which will be provided in greater detail below.

As illustrated in FIG. 1, at step 102 one or more of the systems described herein can send a message specifying a first coherent socket extension link as a destination. For example, at step 102 a sending subcomponent such as a core or Mem0 can, as part of the fabric shown in FIG. 2, send a message specifying a first coherent socket extension link (e.g., Link3) as a destination.

As used herein, the term "coherent socket extension link" can refer to a link or communication channel that can enable inter-socket communications between two microprocessor sockets on a motherboard or computing system. In some examples, the same coherent socket extension link can be configured instead to enable communication between one socket and a peripheral device (e.g., a PCIe peripheral device) rather than between the first socket and a second socket.

Moreover, as used herein, the term "destination" can refer to an intermediary destination as part of a route to a more finalized destination. For example, a message can specify an inter-socket link as an intermediate destination as a route toward a receiving subcomponent on a different socket such that the message is routed over the inter-socket link to reach the finalized destination, as discussed further below.

For purposes of illustration, FIG. 2 shows an example fabric corresponding to a single socket for a microprocessor chip. The fabric can generally be disposed around an input/output die which can correspond to the central or primary die of a corresponding semiconductor device or server. Generally speaking, the server can be packaged with multiple chiplets. Some of these chiplets can hold just cores, whereas one of the chiplets can include the more centralized or monolithic input/output die. The input/output die can include all or predominantly all of the cores and/or memory controllers for the overall server. The input/output die can derive its name from the fact that this particular die contains a substantial portion or predominant majority of input/output logic for a corresponding server.

The fabric can generally support a two processor or two socket system. Thus, any particular memory or coherent station can generally refer to or target any remaining subcomponent within the overall server, and the fabric will appropriately navigate and route traffic to the appropriate socket, core, and/or memory location, for example, while maintaining memory coherence.

In particular, the fabric can maintain memory coherence between this socket and a second and distinct socket, and the fabric can provide multiple coherent socket extension links (e.g., "Link0", "Link1", etc.) for inter-socket communication. In particular, the fabric can provide multiple switches (e.g., "Switch0" through "Switch14") that contain logic for intelligently routing messages between sending subcomponents, such as one or more memories or cores, and receiving subcomponents. In a scenario where a message is directed to a receiving subcomponent on the second and distinct socket (e.g., within a two socket system), one or more of the switches can intelligently route the message to an appropriate or designated link for inter-socket communication.

Figure 3:
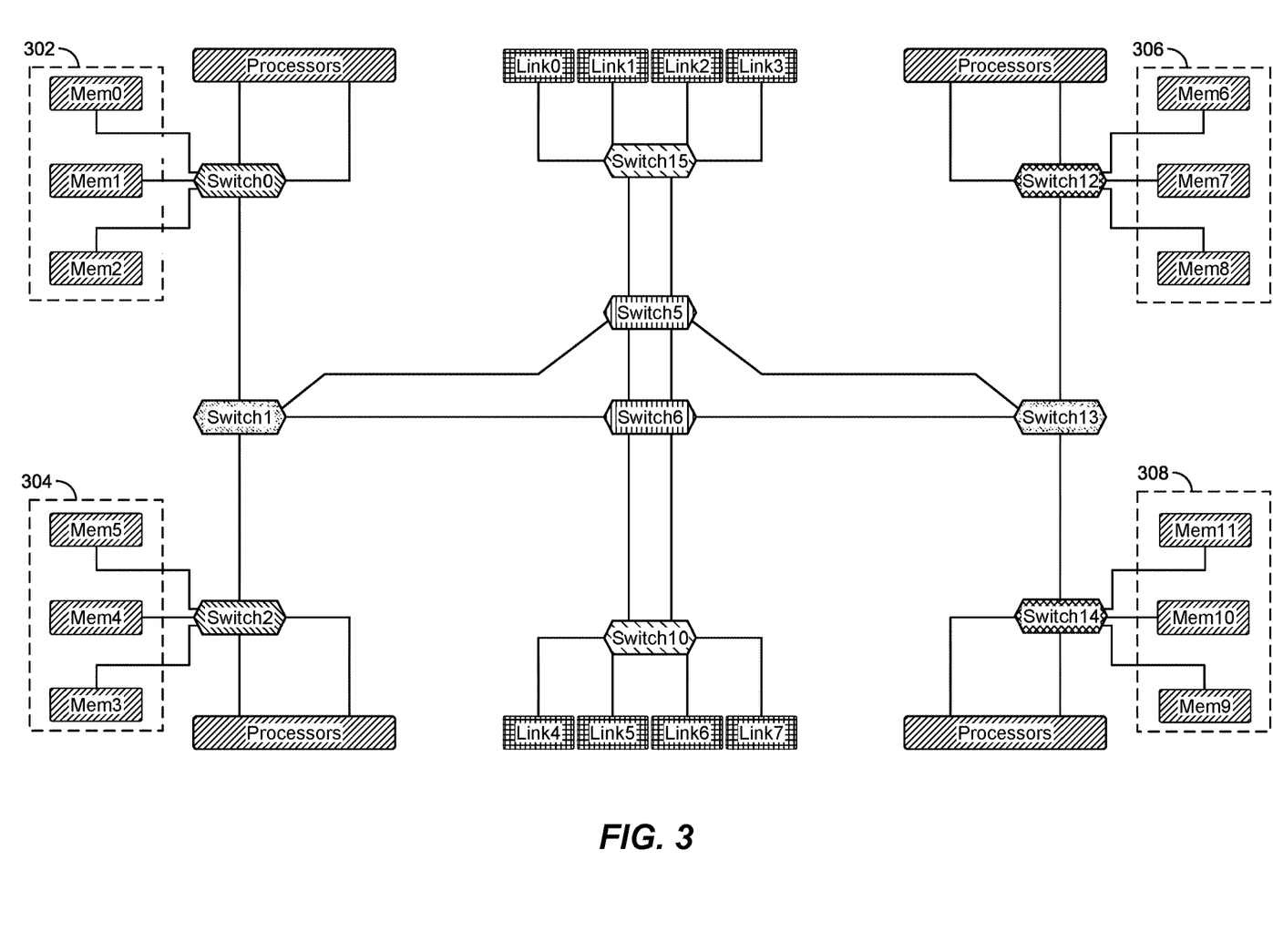
FIG. 3 is a block diagram of the example fabric in which case four separate links have been enabled and evenly divided into a number of receiving subcomponents.

FIG. 3 shows another block diagram corresponding to the fabric of FIG. 2, except that in the scenario of FIG. 3 all four links at the top (i.e., Link0-Link3) have been enabled. Thus, in this scenario, the number of memories (i.e., twelve for Mem0-Mem11) is evenly divisible by the number of links (i.e., four). Accordingly, a first set 302 of three memories can be assigned to a first link, a second set 304 of three memories can be assigned to a second link, a third set 306 of memories can be assigned to a third link, and a fourth set 308 of memories can be assigned to a fourth link. Moreover, the number of enabled links (i.e., four) is also evenly divisible by the number of paths (i.e., two, which correspond to the two paths from each of Switch1 and Switch 13 to the links through either Switch5 or Switch 6) that each memory has to choose from when routing traffic to a corresponding link. In view of the above, the configuration of FIG. 3 does not necessarily create a problematic imbalance that the technology of this application can address and solve, although this problem can arise in scenarios where only three links are configured as enabled, as discussed further in connection with FIG. 4.

Figure 4:
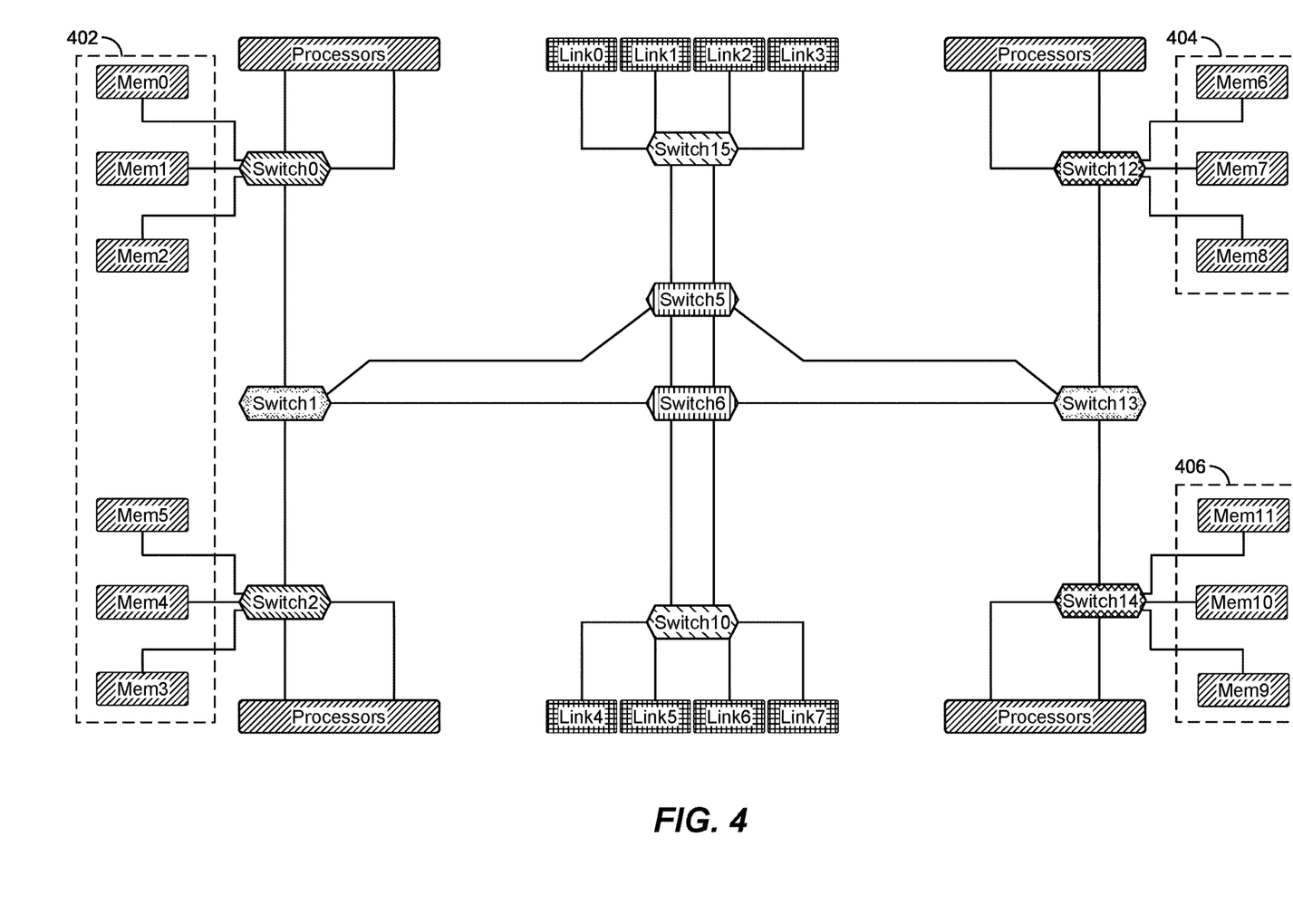
FIG. 4 is a block diagram of the example fabric in which case three separate links have been enabled but are not evenly divisible by a number of intra-fabric communication channels.

FIG. 4 shows another block diagram corresponding to the fabric of FIG. 2, except that in the scenario of FIG. 4 only three links a been enabled (i.e., Link0-Link2) and yet the aliasing methodology of FIG. 1 has not been implemented to address the inefficiency and imbalance first outlined above. As further shown in FIG. 4, in this scenario a first set 402 of six memories has been assigned to a first one of the three links, a second set 404 of three memories has been assigned to a second one of the three links, and a third set 406 of the memories has been assigned to a third one of the three links. Thus, although this configuration provides a clean and consistent mapping between memories and links, the configuration also results in an imbalance whereby one link (e.g., Link0) is forced to service effectively twice the amount of traffic and corresponding memories as another link (e.g., Link1). This imbalance is also exacerbated by the fact that each set of memories is still forced to choose between two separate paths between the memories and the links.

To help address the problem outlined above in the context of FIG. 4, the fabric of FIG. 2 can perform method 100 of FIG. 1. In particular, step 102 of method 100 can be performed in a variety of ways. In some examples, the sending subcomponent corresponds to a core and might be sending the message directed to a memory or coherent station. As used in the context of FIG. 2, the term "memory" (e.g., Mem0-Mem11) can refer to a microprocessor subcomponent designated for ensuring or facilitating memory coherence within a multiprocessor or multicore configuration. The term "memory" in this limited context of memory coherence for multiprocessor systems can be analogous to, or interchangeable with, the terms "home agent" or "coherent station," for example. Thus, in the example of FIG. 2, one or more of the memories can send the message of step 102 and this message can further specify an identifier for a coherent socket extension link, such as Link3. Alternatively, in other examples, the sending subcomponent can correspond to one or more of the cores of FIG. 2. Moreover, as further outlined above, the intended receiving subcomponent can be disposed upon a second and distinct socket that communicates with the socket of FIG. 2 through one or more of the coherent socket extension links such that the message itself can specify an identifier for which specific one of these links is originally intended for communicating the message between subcomponents (i.e., originally intended prior to de-aliasing).

In some examples, the message can include a multicast probe. In contrast to a single cast probe, which can correspond to a single message from one single sending subcomponent to one single receiving subcomponent, a multicast probe can be issued by a single sending subcomponent (e.g., Mem0 in FIG. 2), and yet can generate or result in multiple instances of the corresponding probe being sent to multiple different receiving subcomponents. For example, a multicast probe initiated by Mem0 can generate multiple instances of the corresponding probe, which can be generated by Switch1. In that scenario, the different instances of the corresponding probe should be evenly divided across the two corresponding paths to the inter-socket links (e.g., the path from Switch1-Switch5 and the path from Swatch1-Switch6) rather than creating an imbalance that overly burdens one of these paths over the other.

In some examples, a routing table within a switch records that the identifier for the first coherent socket extension link includes the alias for the second and distinct coherent socket extension link. For example, FIG. 2 shows an example routing table (which can be stored in one or more of the switches Switch0-Switch15) in which an original LinkID functions as the identifier for the coherent socket extension link specified by the message of step 102 for communicating between sockets. The LinkID column specifies six different coherent socket extension links, which correspond to virtual links, and yet only three of the physical coherent socket extension links have actually been enabled in this configuration. In particular, only the three links Link0-Link2 have actually been enabled, whereas the remaining identifiers for links within this column of the routing table have actually been disabled. These disabled links (i.e., LinkID3-LinkID5) now can instead function as aliases for the enabled links according to the values specified within the routing table shown within FIG. 2.

FIG. 2 also further illustrates how the routing table can further specify a switch or path for appropriately routing a corresponding message. Thus, a message specifying an original LinkID of zero and a message specifying an original LinkID of one can both be routed to the actual coherent socket extension link Link0, and yet these two messages can take separate paths according to the routing table. In particular, the first message specifying original LinkID of zero can be routed through Switch5 whereas the second message specifying LinkID of one can be routed through Switch6. Accordingly, the usage of the aliases according to the routing table has effectively doubled the number of coherent socket extension links, thereby overcoming the problem whereby the number of coherent socket extension links (i.e., three) was originally not divisible by the number of paths between Switch1 and the links (i.e., two paths corresponding to Switch5 and Switch6). In other words, the usage of the aliases effectively doubled the number of coherent socket extension links to six, after which point the effective number of coherent socket extension links was evenly divisible by the number of paths, thereby eliminating the imbalance and corresponding inefficiencies associated with the pre-aliasing configuration.

More generally, the routing table creates aliases for coherent socket extension links such that a total number of coherent socket extension links is increased to a number that is evenly divisible by a number of inputs or the number of inputs is evenly divisible by the total number of coherent socket extension links. The inputs can correspond to coherent stations or intra-fabric communication channels. For example, the increased total of six links through aliasing is evenly divisible by the number of intra-fabric communication channels (i.e., two), and is also evenly divisible into the total number of memories shown in FIG. 2 (i.e., twelve for Mem0-Mem11).

Moreover, by doubling the number of coherent socket extension links the effective total of coherent socket extension links forms a power of two. As further discussed above, creating a total of coherent socket extension links as a power of two enables the fabric to evenly divide traffic between the two paths that each sending subcomponent has to choose from when directing traffic across one or more links for inter-socket communications (i.e., for sending subcomponents on the left-hand side of FIG. 2, choose between Switch1-Switch5 or Switch1-Switch 7, and for sending subcomponents on the right-hand side of FIG. 2, choose between Switch13-Switch5 or Switch13-Switch6).

Returning to FIG. 1, at step 104, one or more of the systems described herein can route the message to a second and distinct coherent socket extension link where the identifier for the first coherent socket extension link includes or corresponds to an alias for the second and distinct coherent socket extension link. For example, at step 104, one or more of the switches shown in FIG. 2 can route the message to Link1, despite the fact that the message specified a destination of Link3, because Link3 has actually been deactivated in this configuration and instead functions as an alias for Link1 according to the routing table shown in FIG. 2. Thus, in this example, the identifier for the first coherent socket extension link (i.e., Link3) includes or corresponds to an alias for the second and distinct coherent socket extension link (i.e., Link1).

Figure 5:
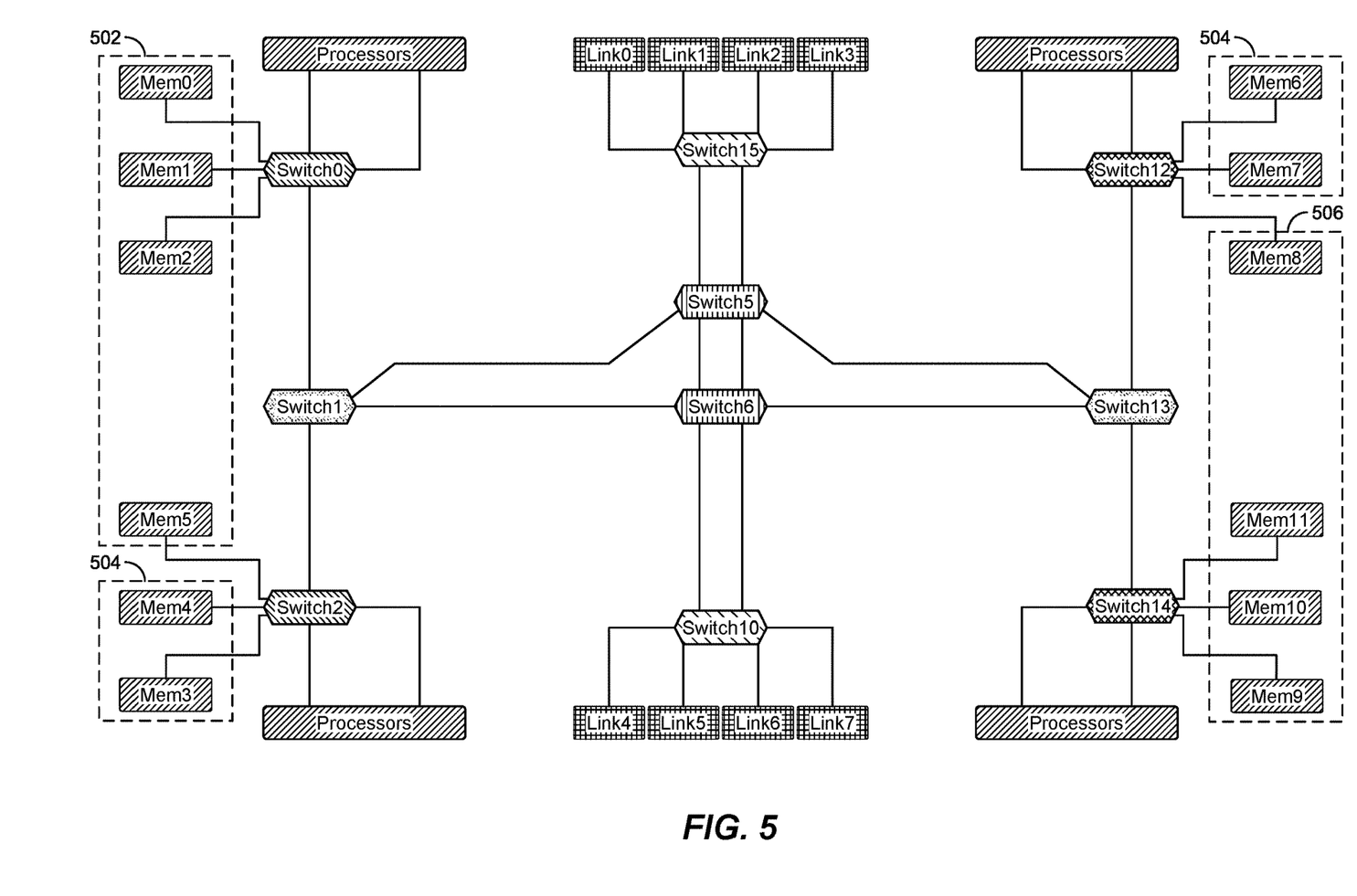
FIG. 5 is a block diagram of the example fabric in which case three separate links have been enabled and the fabric uses aliasing to effectively double the number of links.

FIG. 5 shows another example of the fabric of FIG. 2, except that in this scenario the aliasing method of FIG. 1 has been performed, which further enables the memories to be evenly divided into, and assigned to, corresponding ones of the three enabled inter-socket links. In this particular example, a first set 502 of memories has been assigned to a first one of the links, a second set 504 of memories has been assigned to the second one of the links, and a third set 506 of the memories has been assigned to the third one of the links.

For completeness, FIG. 6 shows a detailed table outlining the partitioning of links within a configuration having three links enabled after the implementation of aliasing, as further discussed above. In this example, each of the instances of "CCM" on the left-hand side of the table (e.g., CCM0-CCM7) can correspond to one or more of the cores that can initiate a packet or message to a corresponding memory. On the other hand, each of the instances of CS_DDR on the right-hand side of the table (e.g., CS_DDR0-CS_DDR11) can correspond to separate ones of the memories that can form the targets for packets or messages initiated by the cores. Moreover, the "CAKES" listed in this table can correspond to the coherent socket extension links outlined above.

The table of this figure helps illustrate how each one of these sending or receiving subcomponents can be assigned both a physical link number and also a virtual link number. Moreover, because two different subcomponents can be assigned to the same underlying actual link using two separate and different virtual links, the higher resolution created by the virtual links can enable these two different subcomponents to use different paths to that underlying actual link, thereby helping to ameliorate spillover or overage otherwise caused by a modulus calculation, and furthermore helping to ameliorate the overburdening of one particular path over another through a corresponding link, as further discussed above. In other words, traffic over an odd number of actual links (i.e., three) can effectively be divided in two through aliasing, to evenly divide the traffic between two separate paths (as discussed above regarding FIG. 2), where the number of virtual links (i.e., six) is evenly divisible by the number of paths but the actual number of physical links (i.e., three) is not.

At a higher level of generality, one inventive concept of this application simply increases the fidelity or resolution of target coherent socket extension links by creating aliases that effectively increase or double a number of such links (i.e., as virtual links). In this scenario, even if multiple virtual links map to the same actual and physical underlying link, the multiple virtual links can nevertheless be mapped to different routes or paths to that same actual and physical underlying link (see the routing table of FIG. 2). This can help to prevent or ameliorate an imbalance that might otherwise inefficiently overburden one of these paths over another. Moreover, even in scenarios where sending subcomponents and receiving subcomponents do not evenly divide into each other, as further discussed above, the increasing or doubling of the resolution of coherent socket extension links nevertheless ameliorates or diminishes spillover or overage that results from using a modulus calculation to assign coherence socket extension links to corresponding sending or receiving subcomponents.

The above discussion provided a general overview of various inventive concepts with respect to FIGS. 1-6. Additionally, the following discussion provides a more concrete and detailed overview of different embodiments of these inventive concepts.

This application is generally directed to the use of link ID aliasing (see FIG. 2 and FIG. 6) in order to better balance links and ensure that probe traffic could take known routes that match between directed probes and multicast probes. By way of nonlimiting example, certain server configurations (e.g., AMD Epyc server systems) can support using only three inter-socket links between sockets, where the maximum can be four. Balancing these three links can become a challenge, because one seeks to avoid generating "hot spots" as many performance values actually base themselves on a slowest subcomponent within the system. Since certain example servers or server SOCs have components that are not divisible by 3 (e.g., eight core complexes, 10 memory channels, etc.), this can lead to an imbalance.

In some examples, a solution can address the above inefficiency by spreading traffic over each of the three links. For example, this can be achieved by assigning each of the moderators (i.e., initiators of traffic) to each of the links on a rotating basis. In other examples, the inefficiency can be addressed by rotating each {moderator, station}pair through each of the links on a rotating basis. In these examples, the moderators can correspond to one or more cores and the stations can correspond to memories or coherent stations, as further discussed above.

This last solution can work reasonably well with requests and responses, it but can create a challenge when intersecting with a feature (i.e., "TgtReqGo") whereby the routing of "directed probes" and "multicast" probes will go through the same path. By way of illustrative example, the reader can consider a scenario whereby CS3 (i.e., coherency station 3) sends a directed probe to CCM5 (i.e., moderator 5), and then sends a multicast probe from CS3 to CCM5 (and possibly other recipients), then these have to go through the same path including, the same inter-socket link. Generally, this means that while requests and responses can spread across all links based on the identifiers of the source and the destination, the multicast probes (and thus the directed probes) in contrast can only pick a particular link based on the source of the message.

In addition to the above, in some examples due to hardware limitations or hardware configurations, all of the probes from a coherent station in a single "quadrant" of the input/output die (e.g., the top right, bottom right, top left, and bottom left quadrants of FIG. 2) would be configured to pick the same link as the switches had to route these multicast probes based on the specified input port. For example, two probes coming from the same input port on Switch1/Switch13 would have to go to either Switch5 or Switch6 (but it had to be a single one per input port). This scenario can result in a dilemma whereby, when a motherboard only populates three inter-socket links, although requests and responses might be nicely balanced, each quadrant may nevertheless still have to be assigned a single link on which to send probes, which can result in a scenario where two quadrants use a single link while the remaining two quadrants each use a single link (see FIG. 4). During performance testing, this can reveal that the "hot spotted" link that was serving probe traffic for two quadrants (up to six coherent stations) would be far slower than the others. This can be due to the fact that, for example, many performance tests measure only when the slowest subcomponent finishes.

The technology of this application can address the problem outlined above such that probes are rebalanced, and furthermore the coherent stations can be assigned to links on a per quadrant basis, while nevertheless using Switch5 and Switch6 equally (see FIG. 2). One initial observation to note is that the reason for splitting between Switch5 and Switch6 might not be because of probes (i.e., because there can be ample probe bandwidth between Switch1/Switch13 and Switch5 to handle all remote probing). Rather, if the configuration does not split the probes, then the configuration would also not split the requests and responses going to remote links, and this would create a bottlenec further k just on the path from Switch1/Switch13 to Switch5.

To further address the problem outlined above, traffic can be routed based on "LinkIDs" (see routing table of FIG. 2) rather than the actual physical links themselves. For example, a particular server configuration might have more actual links available than the number of links that are actually used (e.g., eight actual links, but only three or four enabled). These scenarios resulted in the availability of "spare" LinkIDs. Accordingly, an overall inventive concept of this application is to "alias" multiple LinkIDs to a single physical link, as further discussed above and also below.

By analogy, the usage of link aliasing would be comparable to taking multiple addresses (e.g. "100 Disney Lane" and "110 Disney Lane") into a single final destination ("100

Disney Lane"). Since, in some examples, there may be only three physical links enabled, the usage of virtual link aliasing might effectively create six LinkIDs. In these examples, every physical link that was enabled might have two aliases (i.e., its original identifier and its alias identifier, which can be effectively taken from a physical link that is disabled).

Moreover, in these examples, the path or route that a message could take from a particular quadrant could now be different. By way of illustrative example, in one configuration one set of links (Link0-Link2) can be configured for routing the directed probes so that they always go from Switch1/Switch13 to Switch5 (which had ample bandwidth). On the other hand, in this configuration all six LinkIDs can be used for requests and responses so that one half of the virtual LinkIDs (e.g., Link0-Link2) could be routed through Switch1/Switch13 to Switch5, whereas a second half of the virtual LinksIDs could be routed through Switch1/Switch13 to Switch6. Returning to the analogy from above, if a packet is sent to 100 Disney Lane, the packet may take a route through Dallas TX, whereas if the packet is sent to 110 Disney Lane, the packet might take a route through Nashville TN, and yet both reach the same final destination.

The solution outlined above has at least two immediate benefits. Probe traffic can now be evenly distributed across all three physical links without worrying about switch ports seeing multiple copies (i.e., because now these are only using the route through Switch5). On the other hand, link aliasing results in the fact that Switch6 can be leveraged for requests and responses.

In some examples, there may be combinations of the number of cores/mediators, on the one hand, and memories on the other hand where there still might not be perfect balancing into three separate physical links. In these scenarios, a subcomponent of the fabric can perform a modulus calculation (e.g., a mod three operation) based on the destination and apply a per-source unique bias for remainder cases. This solution works reasonably well in scenarios involving six channels or scenarios involving six core complexes, yet it can create a slight amount of bias involving eight core complexes going into eight channels, while nevertheless improving upon related methodologies.

Nevertheless, in certain examples discussed above (see FIG. 2), there are six virtual link IDs that can now be distributed to communication subcomponents, and then have the subcomponents use a modulus calculation (e.g., modulus 4 operation). In these examples, the communication subcomponents would still be using three separate physical links, but the path to get to the links could be rotated around so that each originator of traffic can use a different set.

Additionally, the technology of this application can also reduce the firmware table size. In some examples, the usage of virtual link aliasing might have increased the tables by having another three sets. With three link platforms, a separate table will be provided for one socket versus another socket (i.e., due to the link topology when two sockets are facing each other with a different omitted link on both sides). In the scenarios outlined above, the two routes on the socket are no longer tied to a physical link number, resulting in differences that can reduce the firmware table size. In particular, the firmware table might only include virtual links zero, one, or two. The firmware can then copy these tables into virtual links three, four, and five, and furthermore propagate the Switch1/Switch13 routes to accommodate the differences there. Similarly, propagating the Switch15 route on socket1 helps to account for the fact that Link1 might be missing instead of Link3. In view of the above, the firmware tables can actually be reduced in size upon introduction of the solution of method 100.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   sending a message specifying a first coherent socket extension link as a destination, wherein the message specifies the first coherent socket extension link using an identifier that is an alias for a second and distinct coherent socket extension link as the destination; and routing the message to the second and distinct coherent socket extension link instead of the first coherent socket extension link based on the identifier being the alias.

2. The method of claim 1, wherein the message is sent by a core to a coherent station.

3. The method of claim 1, wherein the message comprises a multicast probe.

4. The method of claim 1, wherein:
a routing table within a switch records that the identifier for the first coherent socket extension link comprises the alias for the second and distinct coherent socket extension link;
the routing table defines, for the identifier for the first coherent socket extension link, a first route to the second and distinct coherent socket extension link; and
the routing table defines, for a second identifier for the second and distinct coherent socket extension link, a second route to the second and distinct coherent socket extension link that is different from the first route.

5. The method of claim 4, wherein the routing table creates aliases for coherent socket extension links such that a total number of coherent socket extension links is increased to a number that is evenly divisible by a number of inputs or the number of inputs is evenly divisible by the total number of coherent socket extension links.

6. The method of claim 5, wherein the inputs comprise coherent stations or intra-fabric communication channels.

7. The method of claim 4, wherein the routing table doubles a number of coherent socket extension links such that a total number of coherent socket extension links forms a power of two.

8. The method of claim 1, wherein each coherent socket extension link comprises a link for communications between two sockets on a semiconductor computer device or communications between one socket on the semiconductor computer device and a peripheral device.

9. The method of claim 1, wherein the method is performed on a semiconductor computing device with two sockets.

10. The method of claim 1, wherein the method is performed by a scalable fabric within an input/output die.

11. A semiconductor device comprising:
a sender that sends a message specifying a first coherent socket extension link as a destination, wherein the message specifies the first coherent socket extension link using an identifier that is an alias for a second and distinct coherent socket extension link; and
a routing table that routes the message to the second and distinct coherent socket extension link instead of the first coherent socket extension link based on the identifier being the alias.

12. The semiconductor device of claim 11, wherein the sender comprises a core configured to send the message to a coherent station.

13. The semiconductor device of claim 11, wherein the message comprises a multicast probe.

14. The semiconductor device of claim 11, wherein:
the routing table is disposed within a switch and records that the identifier for the first coherent socket extension link comprises the alias for the second and distinct coherent socket extension link;
the routing table defines, for the identifier for the first coherent socket extension link, a first route to the second and distinct coherent socket extension link; and
the routing table defines, for a second identifier for the second and distinct coherent socket extension link, a second route to the second and distinct coherent socket extension link that is different from the first route.

15. The semiconductor device of claim 14, wherein the routing table creates aliases for coherent socket extension links such that a total number of coherent socket extension links is increased to a number that is evenly divisible by a number of inputs or the number of inputs is evenly divisible by the total number of coherent socket extension links.

16. The semiconductor device of claim 15, wherein the inputs comprise coherent stations or intra-fabric communication channels.

17. The semiconductor device of claim 14, wherein the routing table doubles a number of coherent socket extension links such that a total number of coherent socket extension links forms a power of two.

18. The semiconductor device of claim 11, wherein each coherent socket extension link comprises a link for communications between two sockets on a semiconductor computer device or communications between one socket on the semiconductor computer device and a peripheral device.

19. The semiconductor device of claim 11, wherein the semiconductor device comprises a semiconductor computing device with two sockets.

20. A method comprising:
embedding, within a semiconductor device, a sender that sends a message specifying a first coherent socket extension link as a destination, wherein the message specifies the first coherent socket extension link using an identifier that is an alias for a second and distinct coherent socket extension link; and
embedding, within the semiconductor device, a routing table that routes the message to the second and distinct coherent socket extension link instead of the first coherent socket extension link based on the identifier being the alias.

* * * * *